H. TYLER.
HOSE-COUPLING.
No. 174,876. Patented March 14, 1876.
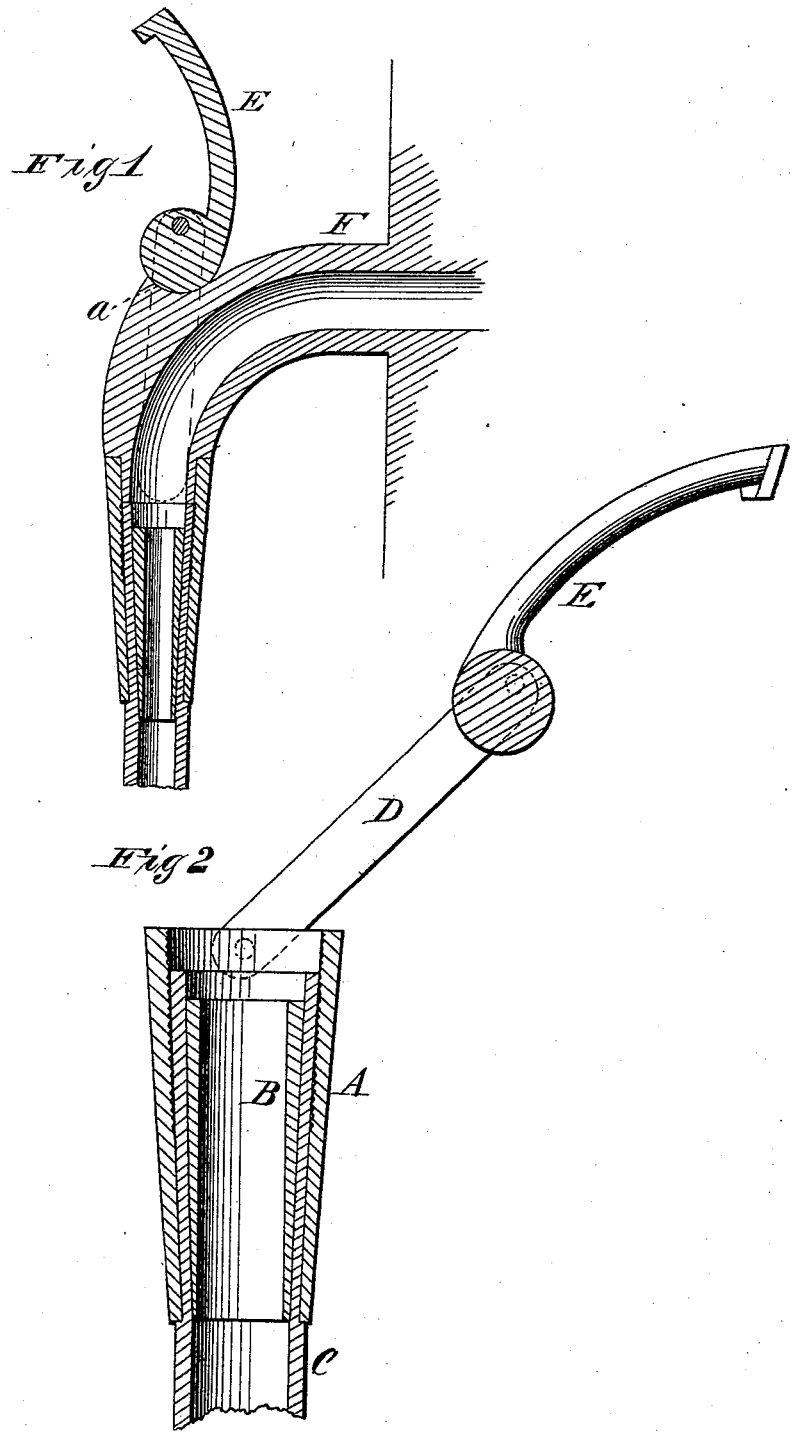
WITNESSES
Franck L. Ourand
C. L. Event
INVENTOR
Hiram Tyler
Alexander Mason
Attorneys.
By
N. PETERS, PHOTO-LITHOGRAPHER, WASHINGTON, D. C.

UNITED STATES PATENT OFFICE.

HIRAM TYLER, OF GENESEO, NEW YORK, ASSIGNOR OF TWO-THIRDS HIS RIGHT TO UNDERHILL DANN AND HARVEY H. CURTISS, OF SAME PLACE.

IMPROVEMENT IN HOSE-COUPLINGS.

Specification forming part of Letters Patent No. 174,876, dated March 14, 1876; application filed January 21, 1876.

*To all whom it may concern:*

Be it known that I, HIRAM TYLER, of Geneseo, in the county of Livingston and in the State of New York, have invented certain new and useful Improvements in Hose-Couplings; and do hereby declare that the following is a full, clear, and exact description thereof, reference being had to the accompanying drawings, and to the letters of reference marked thereon, making a part of this specification.

The nature of my invention consists in the construction and arrangement of a hose-coupling, as will be hereinafter more fully set forth.

In order to enable others skilled in the art to which my invention appertains to make and use the same, I will now proceed to describe its construction and operation, referring to the annexed drawing, in which—

Figure 1 is a longitudinal section, showing my invention applied to couple a hose to the spout of a pump. Fig. 2 is a section through the coupling in enlarged dimensions.

My hose-coupling is composed of an exterior tube, A, and an interior tubular wedge, B, between which the hose C is held. The exterior tube, or shell, A, is also made wedge-shaped or tapering, as shown. The hose C is passed into the shell A through the smaller end to near the larger end thereof, and the interior tube or wedge C is passed into the hose through the large end of the exterior shell, and thereby wedges the hose tightly between the two, the hose, however, projecting beyond the large end of the wedge so as to form the packing-disk. This coupling does not allow the hose to draw out, or the hose and coupling to separate by any strain that it may be subjected to. The inner surface of the outer tube or shell is made rough, in any suitable manner, the better to hold the hose. To attach the hose to the spout F of a pump, the outer shell A is, by links D D, connected with an eccentric-lever, E, which is turned over a shoulder or offset, $a$, on the spout, thereby drawing the coupling tightly against the end of the spout, the hose forming the packing, as shown in Fig. 1. For coupling two pieces of hose together, the exterior shells A are to be provided with suitable screw-threads and a hollow plug screwed into them to form the connection, the ends of said plug being packed with the ends of the hose.

Having thus fully described my invention, what I claim as new, and desire to secure by Letters Patent, is—

The combination with a pump-spout, F, having offset $a$, of the hose C, interior tubular wedge B, exterior tapering shell A, links D D, and eccentric-lever E, all substantially as and for the purposes herein set forth.

In testimony that I claim the foregoing I have hereunto set my hand and seal this 15th day of November, 1875.

HIRAM TYLER. [L. S.]

Witnesses:
 UNDERHILL DANN,
 JAMES J. CONE.